(12) United States Patent  
Nakano

(10) Patent No.: US 6,625,099 B2  
(45) Date of Patent: Sep. 23, 2003

(54) OPTICAL PICK-UP DEVICE

(75) Inventor: Osamu Nakano, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 447 days.

(21) Appl. No.: 09/735,245

(22) Filed: Dec. 12, 2000

(65) Prior Publication Data

US 2001/0005344 A1 Jun. 28, 2001

(30) Foreign Application Priority Data

Dec. 15, 1999 (JP) ............................................ 11-355617

(51) Int. Cl.$^7$ ................................................. G11B 7/00
(52) U.S. Cl. .................... 369/94; 369/44.26; 369/44.37
(58) Field of Search .......................... 369/44.23, 44.24, 369/44.26, 94, 53.2, 112.01, 112.05, 44.27, 112.23, 112.26

(56) References Cited

U.S. PATENT DOCUMENTS 5,408,453 A    4/1995  Holtslag et al.
6,034,939 A  * 3/2000  Takasawa et al. ............ 369/112

FOREIGN PATENT DOCUMENTS

EP         0712 122 B1   4/2000

JP         8-138261      5/1996

* cited by examiner

Primary Examiner—Nabil Hindi
(74) Attorney, Agent, or Firm—Frishauf, Holtz, Goodman & Chick, P.C.

(57) ABSTRACT

An optical pick-up device for optically recording and/or reproducing information on an information record medium having plural record layers and guide tracking layers in the depth direction is disclosed. The optical pick-up device for optically recording and/or reproducing information on an information record medium having plural record layers and guide tracking layers in the depth direction comprises a first light source for radiating first light beam, a second light source for radiating second light beam which is different from the first light beam, plural objective lenses selectively arranged in a common optical path for the first light beam and the second light beam, for focusing first light beam and second light beam with different spot spacing, objective lens selection means for selecting objective lens arranged in a common optical path of plural objective lenses according to depth position of desired record layer to be recorded and/or reproduced of the information recording medium, thereby focusing the first light beam on the guide track layer through the objective lens arranged in the common optical path, and focusing the second light beam on the desired record layer.

6 Claims, 6 Drawing Sheets

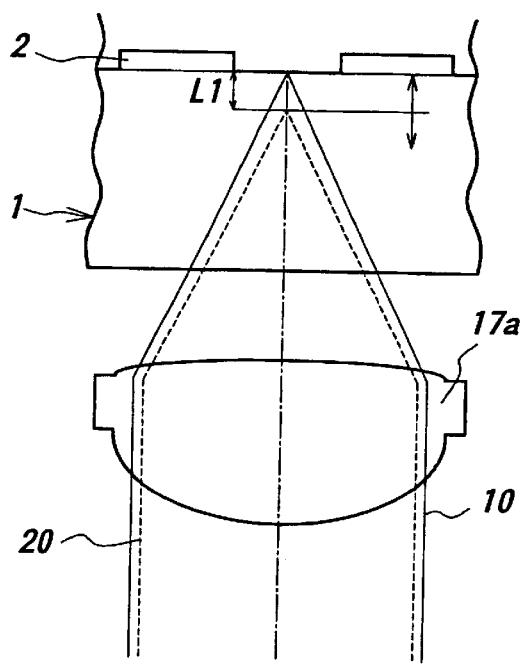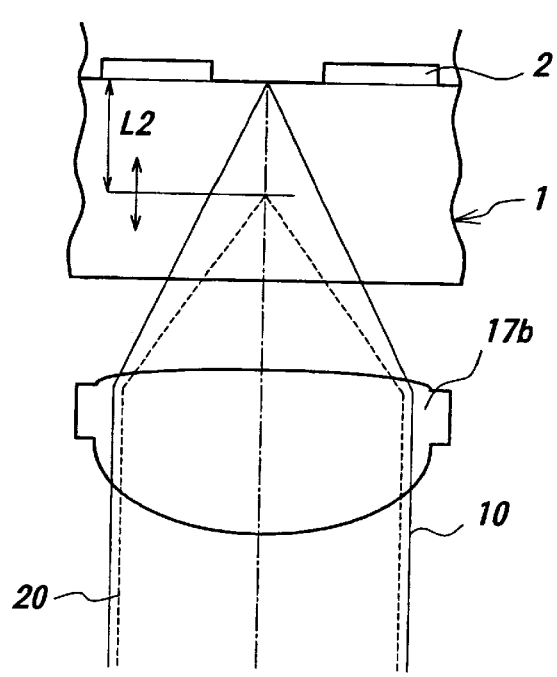

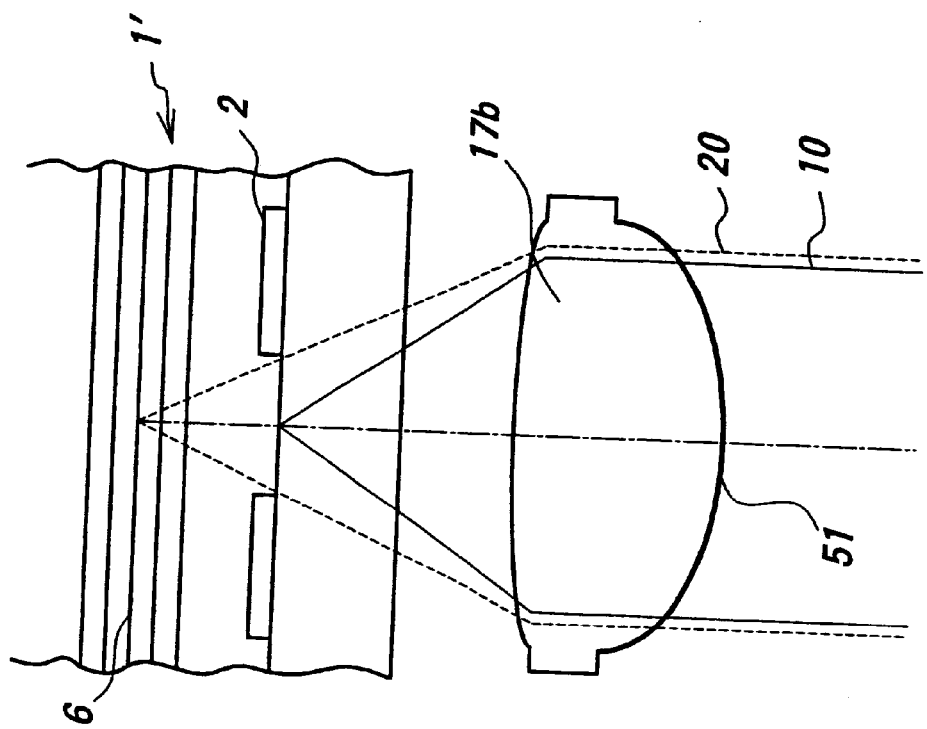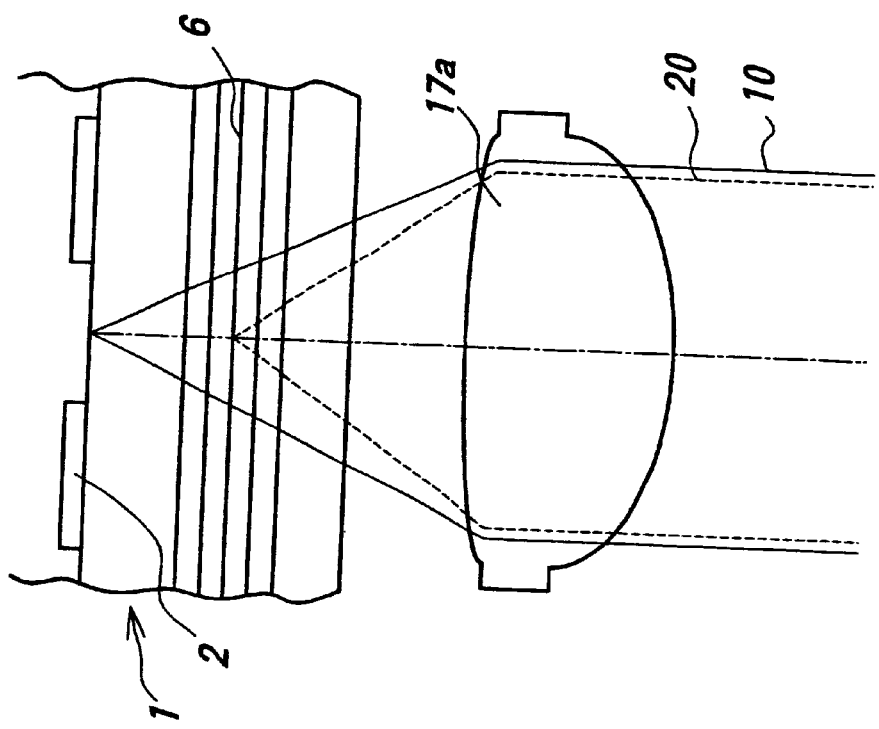

OPTICAL PICK-UP DEVICE

BACKGROUND OF THE INVENTION

1. Field of the Invention

The present invention relates to an optical pick-up device for recording and/or reproducing information for an information record medium having a guide track layer and plural record layers in depth direction.

2. Related art Statement

Such a kind of optical pick-up device has been described in for example U.S. Pat. No. 5,408,453. This optical pick-up device performs recording/reproducing of the information by using a guide track layer at the side near the objective lens, and using the guide light source and the scanning light-source for the information recording medium having the plural record layers at a side away from the objective lens, so that the guide beam from the guide light source is converted into the collimated light flux with the guide collimator lens, and then focused on the guide track layer of the information recording medium through the beam combining element, the galvanometer mirror, and the objective lens. Moreover, the scanning beam from the scanning light source is converted into the collimated light flux with the scanning collimator lens, and then combined with the guide beam by the above beam combining element by adjusting the settling degree and the emanation degree by the optical axis direction deflector and then focused on the record layer at the desired depth of the information record medium through the above galvanometer mirror and the objective lens.

Thus, in the information recording, the guide beam is focused to the guide track layer, and the focusing control and the tracking control are performed based on the return light thereof, and while controlling parallelism of the scanning beam incident on the objective lens with a shifter in the direction of optical axis, the information is recorded by focusing the scanning beam on to the record layer at the desired depth, and then in reproducing and the deletion of information recorded on the record layer at the desired depth, the scanning beam is made to focus on the record layer at the desired depth, and information is reproduced and erased while performing the focus control and the tracking control based on the return light.

By the way, in the case of recording/reproducing information by focusing the guide beam on the guide track layer of information recording medium by the above common objective lens, and by focusing the scanning beam on the record layer located in the desired depth which shifts in optical axis direction, if the collection position of the scanning beam, that is, the position of the record layer is changed and the medium thickness to the scanning beam is changes, the spherical aberration is caused in the scanning beam spot according to the change in the medium thickness, so that the spot becomes large, and thus recording/reproduction performance is deteriorated due to decrease of peak intensity, and stable recording/reproducing to each record layer can not be performed in the depth direction.

Then, in the above conventional optical pick-up device, the aberration correcting element having different thickness area is arranged respectively in the optical paths between the light source and the collimator lens and between the light detector and the collimator lens, these aberration correcting elements are driven independently to locate the given thickness area in the optical path in accordance with the depth position of the selected record layer, thereby correcting spherical aberration.

However, in the above conventional optical pick-up device, the independent aberration correcting element is required for the light source and the light detector, and the driving mechanism for driving these aberration correcting elements independently, is required, so that the number of components become increased and the constitution becomes complicated and large so that the cost-up will be invited.

Moreover, the scanning beam is made incident on the objective lens with collimated light flux and The scanning beam is made incident on the objective lens by adjusting the convergence degree and the divergence degree according to the depth position of the record layer, so that Intensity distribution of the scanning beam incident on the objective lens is changed according to the position of the record layer and the change in diameter of diffraction spot, the aberration deterioration, and the shading or the like are caused due to the scanning beam incident on the objective lens as the convergence light or the emanation light, therefore, the recording/reproducing performance becomes deteriorated.

To prevent deterioration in the recording/reproducing performance, the scanning beam is made incident on the objective lens in the parallel light flux, and the objective lens is moved in optical axis direction according to the depth position of the record layer, so that it is preferred that the guide beam is made incident on the guide track layer so as to focus the guide beam by adjusting its parallelism.

However, in this case, when the collecting position of the scanning beam is changed, the spherical aberration is caused in not only the scanning beam spot but also the guide beam spot formed on the guide track layer, of which the medium thickness is not changed, so that the focusing control and the tracking control become unstable.

For example, in the case of using an objective lens, of which the spherical aberration is corrected for wave length 650 nm, assuming that the wave length of the scanning beam is 650 nm and the wave length of the guide beam is 780 nm, the refractive index falls for wave length 780 nm, so that the lens power becomes weaken, and thus the spherical aberration is generated at an over side. Moreover, in order to make WD of the objective lens (working distance) constant and to focus the guide beam on the guide track layer, the elongation amount of optical path length (the length shown by the state which has no plastic substrate (protective layer 5) to guard plural record layers, that is, the air conversion length shown by the length converted into refractive index (1.0) of air.) due to the chromatic aberration must be amended by thickening the medium thickness, and the spherical aberration is caused on an over side by the increase of the thickness.

Therefore, when NA of the objective lens is assumed to be for example 0.52, the spherical aberration of about 0.02 λrms or more will be generated on the over side.

Moreover, when the guide beam is made incident on the objective lens as the converging light or the emanation light, by moving the guide collimator lens to the optical axis direction in accordance with the movement of the optical axis direction of the objective lens according to the depth position of the record layer, in order to focus the guide beam to the guide track layer, the amount of the spherical aberration, which causes on the guide beam spot, is changed according to it. Particularly, when the guide beam is made incident on the objective lens as converging light, the spherical aberration is further added to the over side for the offset of the spherical aberration of about 0.02 λrms or more at an over side, so that an increase in the yield of the spherical aberration becomes remarkable. Therefore, in case of performing the focus control and the tracking control based on the return light of the guide beam from the guide track layer, those controls become unstable.

In addition, in case of making the numerical aperture of the guide collimator lens to be ½ or less compared to the objective lens, for example, to be 0.2 usually, in order to generate the spherical aberration by which the spherical aberration (0.02 λrms) generated in the guide beam spot is counterbalanced, a very thick aberration correcting element of 3 mm in thickness should be used as an aberration correcting element inserted between the guide light source and the guide collimator lens, since the spherical aberration is proportioned to the fourth power of the numerical aperture of the guide collimator lens Moreover, when the refractive index of the aberration correcting element is assumed to be 1.5, the guide collimator lens should be shifted in the optical axis direction by 3 mm×(1¹⁄₁.₅)=1 mm, together with interlocking to the insertion of the aberration correcting element in the optical path. Thus, not only the aberration correcting element with thick thickness is needed, but also the moving mechanism of guide collimator lens is needed, so that the constitution becomes complicated further more and large-scaled, and thus the cost-up will be invited.

Moreover, in case of moving the scanning beam spot in the depth direction in the medium, over ±50 μm, the amount of the movement of the guide collimator lens becomes very much, so that the moving mechanism have a bigger burden and a vignetting of the guide beam is generated. Particularly, in the optical pick-up device of type performing the high-speed seeking by the movable optical system in the radius direction of the disc, and having a long optical path length of which the optical system is separated by a the fixed optical system, in which a semiconductor laser and a light detector or the like are arranged, and a movable optical system, in which an objective lens or the like are arranged, the vignetting of the guide beam becomes very much.

Therefore, the present invention has for its object to eliminate the above disadvantage of the conventional optical pick-up device. The present invention has for its object to provide an optical pick-up device capable of recording/reproducing information stably on respective record layers in the depth direction with easily, small, and cheaply.

There is described an optical pick-up device for optically recording and/or reproducing information on an information record medium having plural record layers and guide tracking layers in the depth direction comprising: a first light source for radiating first light beam, a second light source for radiating second light beam which is different from the first light beam, plural objective lenses selectively arranged in a common optical path for the first light beam and the second light beam, for focusing first light beam and second light beam with different spot spacing, objective lens selection means for selecting objective lens arranged in a common optical path of plural objective lenses according to depth position of desired record layer to be recorded and/or reproduced of the information recording medium, thereby focusing the first light beam on the guide track layer through the objective lens arranged in the common optical path, and focusing the second light beam on the desired record layer.

According to the invention of the claim 1, the objective lens corresponding to the objective lens selection means is selected according to the depth position of the desired record layer to be recorded and/or reproduced, the first light beam is focused on the guide track layer through the selected objective lens and the second light beam is focused on the desired record layer, so that deterioration in recording/reproducing performance to respective record layers in the depth direction can be effectively prevented by an easy, downsized, cheap constitution, and stable servo signal can be obtained from the return light of the first light beam, and thus recording/reproducing to respective record layers becomes possible with stable.

In the optical pick-up device according to claim 1, the hologram element capable of arbitrarily setting the spot spacing of the first light beam and the second light beam due to the objective lens in the information record medium is provided, in accordance with at least one of plural objective lenses, thereby arranging the hologram element in the common optical path together with the objective lens.

According to the invention of claim 2, freely setting the spot spacing of the first beam and the second beam due to the objective lens can be set in correspondence with the hologram element, and the aberration of respective spots can be corrected.

In the optical pick-up device according to claim 2, the hologram element is formed to the corresponding objective lens.

According to the invention of claim 3, the hologram element is formed in the objective lens in a uniform shape, so that the cost can keep cheap compared with the case that these element and lens are formed separately, and the number of parts can be decreased and assembly can be facilitated.

In the optical pick-up device according to claims 1, 2 or 3, an objective lens driving means for controlling a relative position of the objective lens to the information record medium is provided by at least displacing the objective lens arranged in the common optical path in the given direction, during at the recording and/or reproducing time of information for the information record medium, thereby constituting the objective lens selection means together with including at least a part of the objective lens driving means.

According to the invention of claim 4, as for the objective lens arranged in the common optical path, a relative position to the information record medium is controlled by the objective lens driving means, so that while making the first light beam follow to the desired guide track of the guide track layer with the unfocussed condition, the second light beam to the desired record layer by the unfocussed condition can be unfocussed, and thus the recording/reproducing of more accurate information to respective record layers can be performed. Moreover, the objective lens selection means is constituted by including at least a part of the objective lens driving means, so that the objective lens selection means can be downsized with inexpensive and thus the number of parts can be decreased and assembly can be facilitated.

BRIEF DESCRIPTION OF THE DRAWINGS

FIGS. 2(a) and 2(b) are plan views for explaining a function of two objective lenses shown in FIG. 1;

FIGS. 8(a) and 8(b) are plan views for explaining other modified embodiments similarly.

DESCRIPTION OF THE PREFERRED EMBODIMENTS

Figure 1:
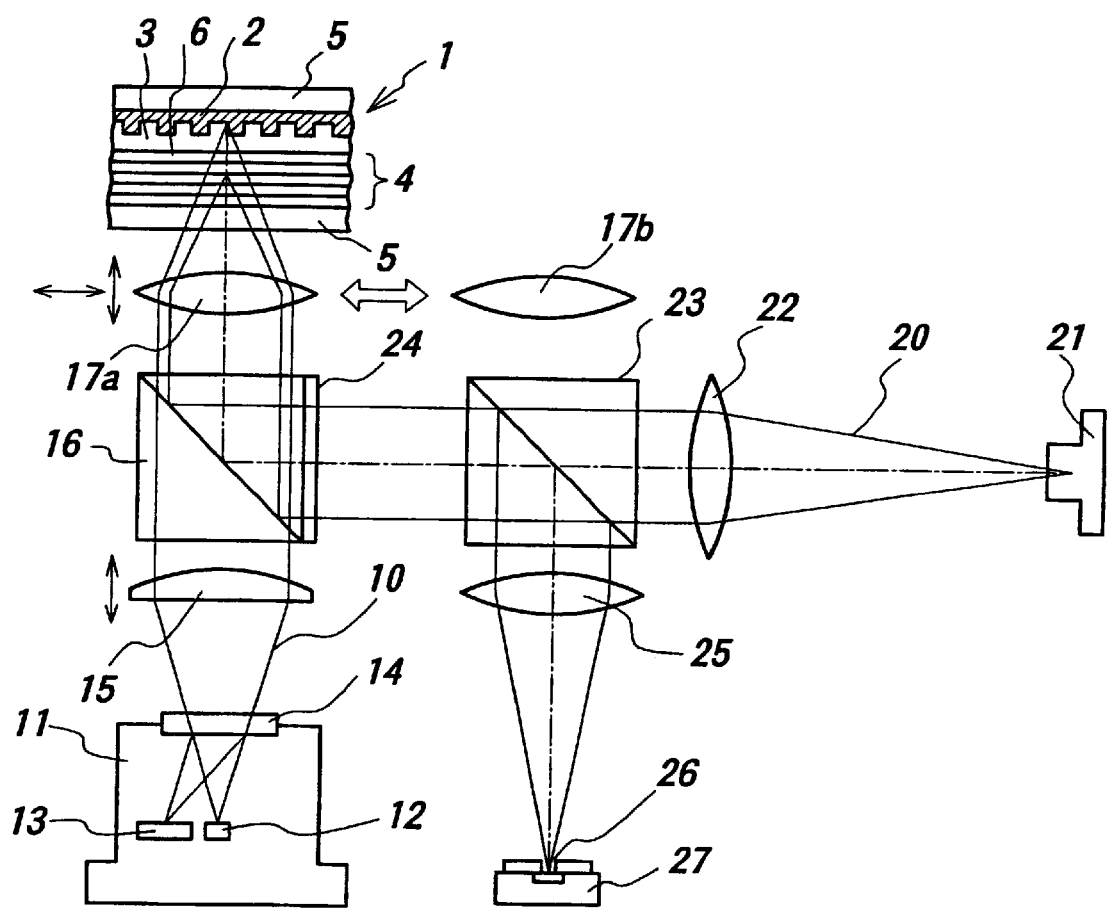
FIG. 1 is a schematic diagram of the optical system showing the first embodiment of the present invention.

Hereafter, the embodiment of the present invention is explained referring to the drawing. FIG. 1 is an entire outline block diagram of the optical system showing the first embodiment of the present invention. In FIG. 1, an information recording medium 1 has a guide track layer 2 having grooves, a record mediums 4 provided on the guide track layer 2 through an absorber layer 3 for the recording/ reproducing laser light, such as photo polymer, photo-refractive crystal and photo-chromic materials or the like, and a protective layer 5 provided on the surface of the record medium 4 and on the other surface of the guide track layer 2, respectively, so that plural record layers 6 are formed in such a manner that the information is recorded by making the refractive index and the light absorptance of the record medium changed at different depth positions in the record medium 4. In this embodiment, servo laser light 10 (first beam) and recording/reproducing laser light 20 (second beam) for performing focusing control and tracking control to control, respectively, are irradiated on this information record medium 1 from the side of record medium 4, thereby recording/reproducing information on the desired record layer. Moreover, the wave length of servo laser light 10 is lengthened more than the wave length of recording/ reproducing laser 20.

The servo laser light 10 is emanated from a light source unit 11.

The light source unit 11 is provided with a semiconductor laser 12 (first light source), a photo detector 13, and a hologram 14 to emanate the servo laser light 10 from the semiconductor laser 12 through the hologram 14. The servo laser light 10 from the light source unit 11 is focused on the guide track layer 2 of the information record medium 1, in accordance with the depth position of desired record layer 6 to be recorded/reproduced through a collimator lens 15 and a dichroic prism 16, by an objective lens 17a or 17b selected by the objective lens selection means described later and selected from the plural objective lenses (in this embodiment, two objective lenses 17a and 17b).

Moreover, the servo laser light 10 capable of being reflected by information record medium 1 traces the return route opposite to the outward route, and is irradiated on the hologram 14 of light source unit 11 through the objective lens 17a or 17b, the dichroic prism 16 and the collimator lens 15 to diffract them, and then its diffracted light is received on the optical detector 13 to detect the focusing error signal by well-known beam sizing method and the Foucault method, etc., and detect the tracking error signal by the push-pull circuit method etc.

On the other hand, the recording/reproducing laser light 20 is emanated from a semiconductor laser 21 (second light source). The laser light emanated from the semiconductor laser 21 is converted into parallel light by a collimator lens 22 and is made incident on a polarization beam splitter 23 with P polarized light, the laser light transmitted through the polarization beam splitter 23 is made incident on the dichroic prism 16 through the ¼ wave plate 24, and is reflected by the dichroic prism 16 and then led in the optical path common to the above servo laser light 10, and the recording/ reproducing laser light 20 led to the common optical path is focused on the information track of the desired record layer 6 in the information record medium 1 by the objective lens 17a or 17b selected by the objective lens selection means.

Moreover, the recording/reproducing-laser light 20 reflected by the information record medium 1 traces the route opposite to the outward route, and is made incident on the polarization beam splitter 23 through the objective lens 17a or 17b, the dichroic prism 16, and the ¼ wave plate 24. Here, the reflected light incident on the polarization beam splitter 23 from the information record medium 1 becomes S polarized light by twice transmission of the ¼ wave plate 24 in the outward route and the return inward route and is reflected by polarization beam splitter 23. The laser light reflected by the polarization beam splitter 23 is focused on a detection lens 25, and is received at the focused point on a PIN photo diode 27 through a pinhole 26, thereby reproducing information recorded on the desired record layer of information record medium 1 based on its output.

The collimator lens 15 as component of primary shaft actuator (not shown) with position detector comprises a lens holder for supporting the lens, plural leaf springs (for example, two) for supporting the lens holder, and plural wires (for example, four). The focusing coil is secured to the outer periphery plane of the lens holder. One the other hand, two permanent magnets magnetized in the direction of thickness is arranged at the position opposed to the focusing coil in an optical head body. Moreover, the primary shaft actuator comprises an optical position detector consisting of the light emitting element and the light receiving element to detect the position of the focusing direction of the collimator lens (optical axis direction) and a magnetic detector consisting of a Hall element and a permanent magnet. The collimator lens 15 is driven in the focusing direction by energizing the focusing coil, and the information at the moved position is sent to the controller (CPU) by the output of the above position detector, thereby controlling the collimator lens 15 to move it to the desired position. Moreover, the objective lenses 17a and 17b are held to the common holder as described latter, and the objective lens 17a or 17b arranged at least in the common optical path of the servo laser light 10 and the recording/reproducing laser light 20 is driven in the focusing direction and in the tracking direction by the objective lens driving means for the information record medium 1, thereby controlling its relative position. Moreover, as described later, in this embodiment, the objective lens selection means is constituted by including at least a part of the objective lens driving means.

Thus, the recording/reproducing laser light 20 is made incident on the objective lens 17a or 17b with the collimated light flux and is moved in the optical axis direction in accordance with the depth position of the desired record layer 6 to be recorded/reproduced, the collimator lens 15 is moved in the optical axis direction so as to focus it on the guide track layer 2, and made incident on the objective lens 17a or 17b by adjusting parallelism of the servo laser light 10, the objective lens 17a or 17b is driven in the focusing direction and in the tracking direction with this state based on the above focusing error signal and the tracking error signal, the servo laser light 10 is focused on the guide track layer 2, thereby following the desired guide track, and the desired track is followed while focusing the recording/ reproducing laser light 20 on the desired record layer 6, thereby recording or reproducing information.

In this embodiment, assuming that for example, the wave length of servo laser light 10 emanating from the semiconductor laser 12 is 780 nm, the focal distance of the collimator lens 15 is 18 mm, the wave length of the recording/ reproducing laser light 20 emanating from the semiconductor laser 21 is 650 nm, the focal distance of the collimator lens 22 is 12 mm, and the numerical aperture is 0.138. Moreover, the objective lenses 17a and 17b are formed by the material having a different dispersion, and each numerical aperture is 0.52.

In this embodiment, the objective lens 17a is designed by using BaCD5 (made by Hoya Corp. Ltd.) of for example Abbe number 61 as a raw glass and obtaining a chromatic aberration 0.102 μm/nm (air conversion length). Therefore, when the servo laser light 10 of 780 nm in wave length and the recording/reproducing laser light 20 of 650 nm in wave length are made incident on the objective lens 17a, as shown in FIG. 2(a), the servo laser light 10 is focused from the focusing position of the recording/reproducing laser light 20 to the remote position from the objective lens 17a, and when the refractive index of the objective lens 17a is 1.57, the distance L1 becomes $$L1=0.102\times(780-650)\times1.57\approx20(\mu m).$$

Then, in this embodiment, the objective lens 17a is used for the record layer 6 situated in the region of $20\pm20(\mu m)$ from the guide track layer 2 of the information record medium 1 in the depth direction, and the servo control is performed by moving the collimator lens 15 in the optical axis direction so as to focus the servo laser light 10 on the guide track layer 2, and the objective lens 17a is moved in the optical axis direction, so as to focus the recording/reproducing laser light 20 on the desired record layer 6 in the above region, thereby recording/reproducing information while performing the focusing control and the tracking control in this condition.

Moreover, the objective lens 17b is designed by using FDS90 of for example Abbe number 24 as a raw glass and obtaining a chromatic aberration 0.295 μm/nm (air conversion length). Therefore, when the servo laser light 10 of 780 nm in wave length and the recording/reproducing laser light 20 of 650 nm in wave length are made incident on the objective lens 17b, as shown in FIG. 2(b), the servo laser light 10 is focused from the focusing position of the recording/reproducing laser light 20 to the remote position from the objective lens 17b, and when the refractive index of the objective lens 17b is 1.57, the distance L2 becomes $$L2=0.295\times(780-650)\times1.57\approx60(\mu m).$$

Then, in this embodiment, the objective lens 17b is used for the record layer 6 situated in the region of $60\pm20(\mu m)$ from the guide track layer 2 of the information record medium 1 in the depth direction, and the servo control is performed by moving the collimator lens 15 in the optical axis direction so as to focus the servo laser light 10 on the guide track layer 2, and the objective lens 17b is moved in the optical axis direction, so as to focus the recording/reproducing laser light 20 on the desired record layer 6 in the above region, thereby recording/reproducing information while performing the focusing control and the tracking control in this condition.

Thus, plural objective lenses 17a and 17b formed by the material with different dispersion are provided, the collecting space i.e. focusing length of the servo laser light 10 and the recording/reproducing laser light 20 in the respective objective lens are made different, so that by selecting and using the objective lens 17a or 17b according to the depth position of desired record layer 6 to be recorded/reproduced, an increase in spherical aberration can be suppressed from guide track layer 2 in the depth direction to 0.01 λrms or less over a wide region of 80 μm, thereby performing the recording/reproducing with excellent quality. Moreover, when servo laser light 10 is focused on-the guide track layer 2 the moving amount of the collimator lens 15 can be reduced by using the objective lens 17a and 17b switchably, so that the moving mechanism can be easily made, and the increase in vignetting of the servo laser light 10 in the selected objective lens 17a or 17b and in spherical aberration caused by the servo laser light 10 incident on the objective lens 17a or 17b can be suppressed small.

Next, the objective lens driving means having the objective lens selection means for selecting the above objective lenses 17a and 17b, is explained as in the same manner as EP 0 712 122 B1.

Figure 3:
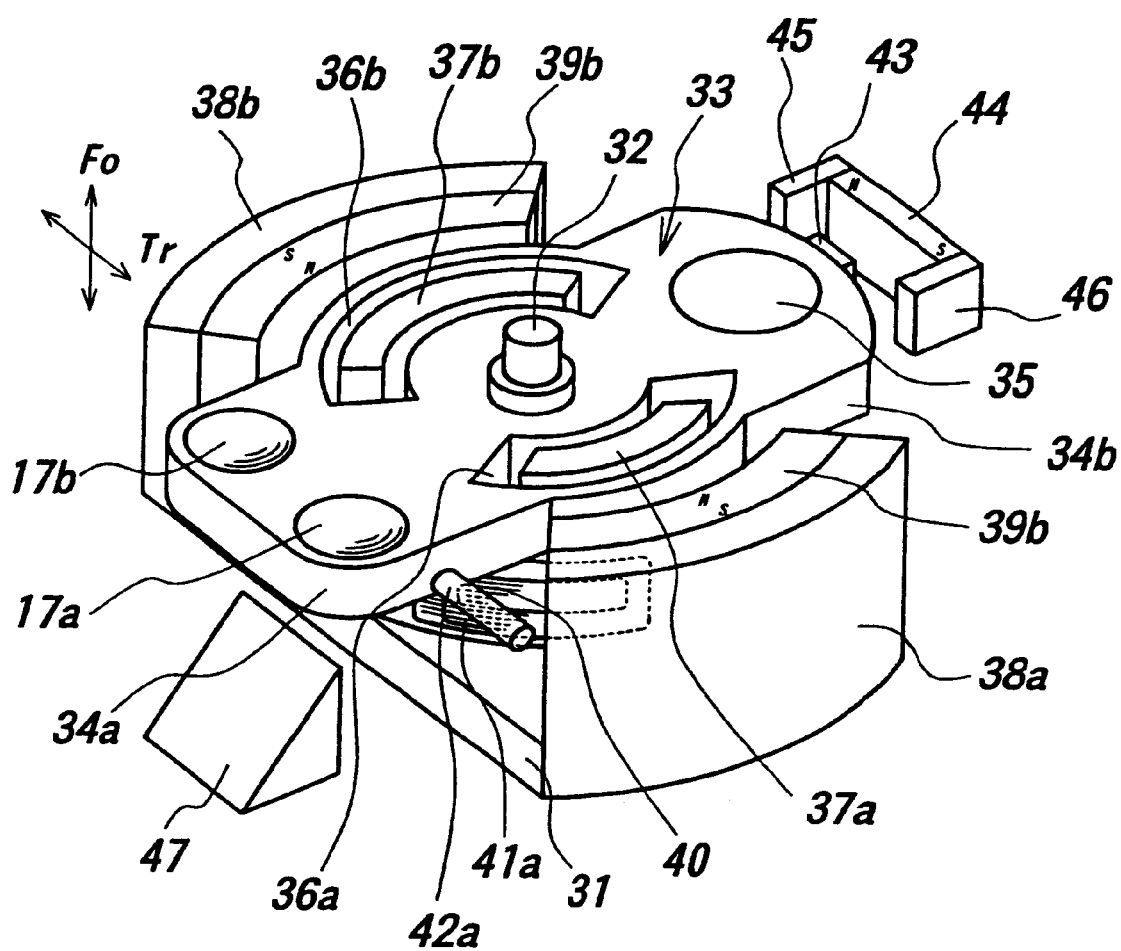
FIG. 3 is a perspective view showing a constitution of one embodiment of the objective lens driving means shown in a first embodiment.
Figure 4:
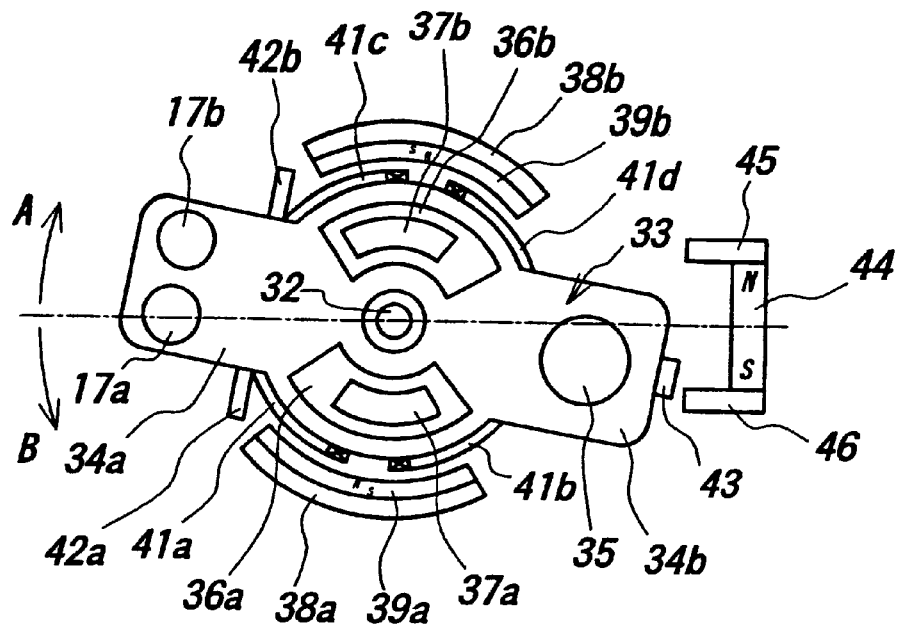
FIG. 4 is a plan view of FIG. 3.

FIGS. 3 and 4 are a perspective view and a plan view showing the constitution of one embodiment of the objective lens driving means.

The objective lens driving means is made a so-called axle sliding system, a shaft 32 made of magnetic substance is studded to a base 31, and a holder 33 is mounted to the shaft 32 rotatably and slidably in the axial direction (the focusing direction Fo). The Holder 33 is provided with projections 34a and 34b at substantially symmetrical position to the shaft 32, the opening is formed to its one projection 34a, and objective lenses 17a and 17b are mounted to the opening so as to be juxtaposed in the tracking direction Tr, adjacently, and then the other projection 34b is provided with a balancer 35. Moreover, these objective lenses 17a and 17b are mounted to the bolder 33 in such a manner that the recording/reproducing laser light 20 is focused on the position of L1 and L2 (FIGS. 2a and 2b) from guide track layer 2 of the information record medium 1 respectively at the same position in the focusing direction of the holder 33.

Two sectorial openings 36a and 36b are formed in holder 33 opposed in the tracking direction Tr around the shaft 32, and inner yokes 37a and 37b provided in the base 31 are located in these openings 36a and 36b, respectively. Moreover, the base 31 is provided with outer yokes 38a and 38b through the holder 33 so as to oppose to the inner yoke 37a and 37b, respectively, and permanent magnets 39a and 39b are mounted to these outer yokes 38a and 38b, respectively, in such a manner that its same poles are opposed to each other. In addition, a focusing coil 40 is wound on the lower portion of the holder 33 at its outer periphery and two flat tracking coils 41a, 41b; 41c, 41d are mounted on the portions opposite to the tracking direction Tr in such a manner that one vertical arm portion of each tracking coils is opposite to the permanent magnet 39a or 39b. Thus, the magnetic circuit is constituted, and the magnetic flux is made effected on the focusing coil 40 and two corresponding coils 41a, 41b; 41c, 41d by respective permanent magnets 39a and 39b.

In addition, the holder 33 is provided with stoppers 42a and 42b at the projection 34a, to which objective lens 17a and 17b is provided with, in contact with the outer yokes 38a and 38b respectively, so as restrict excessive rotation of the holder 33, and a magnetic slice 43 is provided on the projection 34b to which the balancer 35 is provided with. Moreover, the base 31 is provided with a permanent magnet 44 magnetized in the tracking direction Tr so as to oppose it to the magnetic slice 43, and Yokes 45 and 46 are secured to respective magnetic poles of the permanent magnet 44.

In the above constitution, as shown in FIG. 2(a), when information is recorded/reproduced on/from the record layer 6 positioned in the region of $20\pm20(\mu m)$ from the guide track layer 2 of the information record medium 1 in the depth direction, the objective lens 17a is selected, so that the servo laser light 10 and the recording/reproducing laser light 20 are irradiated on the information record medium 1 by the objective lens 17a. Moreover, here, the servo laser light 10 and the recording/reproducing laser light 20 synthesized by the dichroic prism 16 are reflected to the side of the information record medium 1 at the start-up mirror 47 and then is made incident on the objective lens 17a.

On selecting the objective lens 17a, first of all, the pulse-shaped direct current with given size is supplied to the tracking coils 41a, 41b; 41c, and 41d to rotate the holder 33 in the direction of A in FIG. 4, and along with its rotation, Magnetic piece 43 provided to the holder 33 is attracted magnetically to the permanent magnet 44 through the yoke 46, and thus so as to locate the objective lens 17a on a start-up mirror 47. Moreover, in this case, an excessive rotation of the holder 33 is restricted by touching the stopper 42b of the holder 33 to the outer yoke 38b.

Then, the servo control for moving the collimator lens 15 in the direction of optical axis so as to focus the servo laser light 10 on the guide track layer 2, is performed, and the bias current is supplied to the focusing coil 40 to slide the holder 33 along the shaft 32, in such a manner that the recording/reproducing laser light 20 is focused on the desired record layer 6 in the above region. Under such a condition, the tracking error signal is supplied to tracking coil 41a, 41b; 41c, 41d, thereby performing the tracking control for making the holder 33 minutely rotated about the shaft 32, and information is record/reproduced on/from the desired record layer 6 while performing the focusing control to slide the holder 33 along the shaft 32 by supplying the focusing error signal to the focusing coil 40.

Moreover, as shown in FIG. 2(b), in the case that the objective lens 17b is selected from the state shown in FIG. 4 to record/reproduce the information on the record layer 6 in the region of 60±20($\mu$m) from the guide track layer 2 of the information record medium 1 in the depth direction, the pulse-shaped direct current with given size is supplied to the tracking coil 41a, 41b; 41c, 41d in the second direction opposite to the first direction, to rotate the holder 33 in the direction of B in FIG. 4 against the magnetic attraction of magnetic piece 43 due to the yoke 46, and the magnetic piece 43 is magnetically attracted by the permanent magnet 44 through yoke 45 accompanying with its rotation, thereby positioning the objective lens 17b over the on start-up mirror 47. In this case, an excessive rotation of the holder 33 is restricted by touching the stopper 42a of the holder 33 to the outer yoke 38a.

Then, as the same as the above case, the servo control for moving the collimator lens 15 in the direction of optical axis so as to focus the servo laser light 10 on the guide track layer 2, is performed, and the bias current is supplied to the focusing coil 40 to slide the holder 33 along the shaft 32, in such a manner that the recording/reproducing laser light 20 is focused on the desired record layer 6 in the above region. Under such a condition, the tracking error signal is supplied to tracking coil 41a, 41b; 41c, 41d, thereby performing the tracking control for making the holder 33 minutely rotated about the shaft 32, and the information is record/reproduced on/from the desired record layer 6 while performing the focusing control to slide the holder 33 along the shaft 32 by supplying the focusing error signal to the focusing coil 40.

Moreover, in the case of switching the holder 33 from the state of selecting the objective lens 17b to the state of selecting the objective lens 17a, the holder 33 is rotated in the direction of A in the FIG. 4 against the magnetic attraction of the magnetic piece 43 due to the yoke 45 by applying the pulse-shaped direct current with given size of the above first direction to the tracking coil 41a, 41b; 41c, 41d, thereby positioning the objective lens 17a over the start-up mirror 47, and thus the rotating position of the holder 33 is held by the magnetic attraction of the magnetic piece 43 due to the yoke 46.

Thus, the objective lenses 17a or 17b arranged in a common optical path of the servo laser light 10 and the recording/reproducing laser light 20 are driven in the focusing direction Fo and the tracking direction Tr by the objective lens driving means, and a relative position to the information record medium 1 is controlled, so that while making the servo laser light 10 follow to the desired guide track of the guide track layer 2 in the focusing state, recording/reproducing laser light 20 can be focused on the desired record layer 6 with info cussing condition, and thus the information can be accurately recorded/reproduced on each record layer.

Moreover, the objective lens selection means for switching the objective lens 17a and 17b is constituted by using the tracking control mechanism of the objective lens driving means, so that the constitution can be made easy, downsized and cheap as compared with the case that the objective lens selection means is provided independently of the objective lens driving means, and thus the number of parts can be decreased, and assembly can be facilitated.

Moreover, in the above objective lens driving means, in respective states of the recording/reproducing state of the objective lens 17a, and the recording/reproducing state of the objective lens 17b, the operation neutral position of the holder 33 in the tracking direction Tr was held in magnetically by the magnetic piece 43, the permanent magnet 44, and the yokes 45 and 46, so that the tracking control can be performed stably. Moreover, the objective lens 17a and 17b were held adjacent to the holder 33, so that a rotating angle of the holder 33 can be made small in case of switching the objective lens, and the switching control can easily be performed. Moreover, the objective lens 17a and 17b were mounted to the holder 33 in such a manner that the recording/reproducing laser light 20 is focused on the position of L1 and L2 from the guide track layer 2 of the information record medium 1, respectively, at the same position of the focusing direction of the holder 33, so that there is an advantage by which the moving amount in the focusing direction Fo of the holder 33 can be minimized.

Moreover, in the above mentioned objective lens driving means, the shaft sliding method for making the holder 33 to hold the objective lenses 17a and 17b slide in the rotating direction and the axial direction for the shaft 32, was used, but an other method, for example, the method for holding the holder to support the objective lens, may be held with four wires. Moreover, the operation center valve position of holder 33 in the tracking direction can be selected by only supplying the bias current in the desired direction to the tracking coil without using the magnetic piece 43 and the permanent magnet 44.

Figure 5:
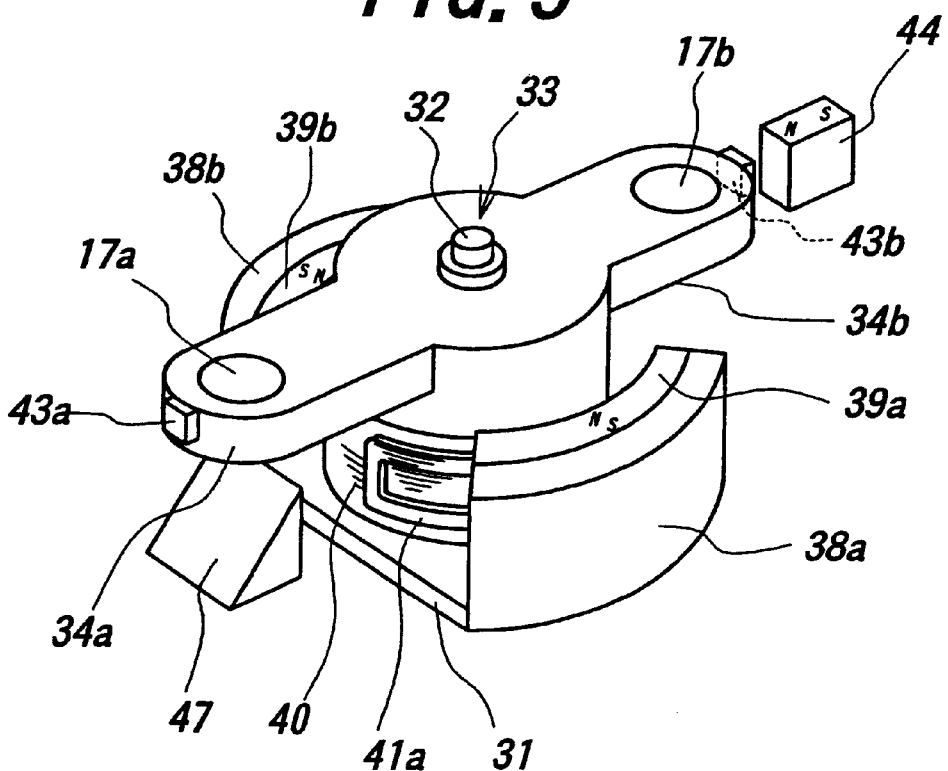
FIG. 5 is a perspective view showing a constitution of other embodiments of the objective lens driving means shown in first embodiment.

FIG. 5 is a perspective view showing the constitution of other embodiment of the objective lens driving means. In FIG. 5, the same sign is applied to the member having the same operation as the member shown in FIG. 3 and FIG. 4, and the explanation thereof is omitted. This objective lens driving means is formed in such a manner that the opening is provided to the projections 34a and 34b provided in the holder 33, and the objective lenses 17a and 17b are mounted to these openings, so that the objective lens 17a or 17b can be positioned over the start-up mirror 47, selectively, by rotating the holder 33 by 180 degrees. Therefore, permanent magnets 39a and 39b and the outer yokes 38a and 38b constituting the magnetic circuit are provide downward from the projections 34a and 34b so as to avoid the interference with projections 34a and 34b. Moreover, edge portions of the projections 34a and 34b are provided with respective magnetic pieces 43a and 43b, respectively and At the side of the shaft 32 opposite to the start-up mirror 47, the permanent magnet 44 secured to the base 31 is provided selectively against the magnetic pieces 43a and 43b so as to attract these magnetic pieces 43a and 43b.

Moreover, in FIG. 5, inner yokes 37a and 37b shown in FIG. 3 and FIG. 4 are not designated, but These inner yokes 37a and 37b can be provided by similarly forming the opening to the holder 33, and can be provided by making the lower side of the holder 33 cylindrical and in its inside.

FIG. 5 shows a state that the objective lens 17a is located on the start-up mirror 47, that is, the state of recording/reproducing the information on the record layer 6 positioned at the region of the depth of L1(20 $\mu$m)±20 $\mu$m from the guide track layer 2 of the information record mediums 1, but under such a condition, the magnetic piece 43b provided in the holder 33 is attracted magnetically by the permanent magnet 44, so that the neutral position of the tracking control is restricted. Therefore, under such a condition, the tracking error signal is supplied to the tracking coil 41a, 41b; 41c, 41d, the tracking control for making the holder 33 minute rotating around the shaft 32, is performed, and the focus error signal is supplied to the focusing coil 40, so that the information can be record/reproduced on/from the desired record layer 6 in the depth region, while performing the focusing control to make holder 33 slide along the shaft 32.

Moreover, in the case that the objective lens 17b is selected from the state shown in FIG. 5, the pulse-shaped direct current of given size of first direction is supplied to the tracking coil 41a, 41b; 41c, 41d, the holder 33 is rotated against the magnetic attraction of the magnetic piece 43b due to the permanent magnet 44 in a given direction. Subsequent, when the holder 33 is rotated exceeding 90 degrees and turning to 180 degrees neighborhood, the pulse-shaped direct current of given size in the second direction opposite to the first direction is supplied to the tracking coils 41a, 41b; 41c, 41d, and the turn of the holder 33 is broken and thus the magnetic piece 43a is attracted magnetically, by the permanent magnet 44. As a result, the objective lens 17b is located over the start-up mirror 47, and the neutral position of tracking control of the objective lens 17b is restricted by a magnetic attraction of the magnetic piece 43a due to the permanent magnet 44. Therefore, under such a condition, as in the same as the above case, while performing the tracking control and the focusing control, the information can be recorded/reproduced on a certain desired record layer 6 positioned at the depth region of L2(60 $\mu$m)±20 $\mu$m from the guide track layer 2 of the information record mediums 1. Moreover, the case of the switching from the objective lens 17b to the objective lens 17a is also performed in the same way.

In the objective lens driving means shown in FIG. 5, the objective lenses 17a and 17b were mounted to the holder 33 so as to become symmetry for shaft 32, so that the objective lenses 17a and 17b will act mutually as a counter weight. Therefore, the balancer 35 shown in the FIGS. 3 and 4 need not be used, so that The number of parts can be further reduced, and can keep cheaper further, and thus the driving sensitivity of the objective lens can be raised.

Figure 6:
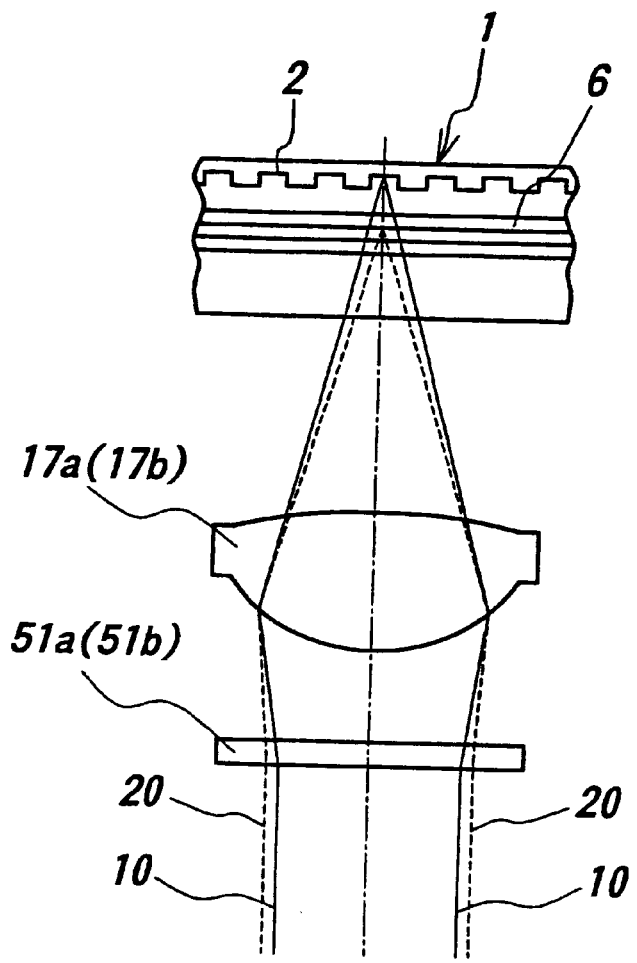
FIG. 6 is a schematic diagram showing the constitution of the principal portion of the second embodiment of the present invention.

FIG. 6 is a schematic diagram showing the constitution of the principal portion of the second embodiment of the present invention. This embodiment provides hologram elements 51a and 51b corresponding to the objective lenses 17a and 17b, respectively, in the first embodiment, a corresponding hologram element 51a (51b) is inserted in the common optical path between the selected objective lens 17a (17b) and the dichroic prism 16, by interlocking with the switching of the objective lens 17a (17b). Moreover, the hologram element 51a (51b) is held to the holder 33, for example, in FIGS. 3 or 5 in accordance with the objective lenses 17a and 17b, so as to exchange the objective lens 17a and the hologram element 51a, as well as the objective lens 17b and the hologram element 51b as a pair with unity form.

In such a way, the servo laser light 10 and the recording/reproducing laser light 20 are diffracted by each hologram element 51a(51b), and respective primary lights are incident on the objective lens 17a (17b), thereby making an image.

According to this embodiment, the hologram elements 51a and 51b are provided in accordance with respective objective lenses 17a and 17b, respectively, so that in each objective lens, the spot spacing of the servo laser light 10 and the recording/reproducing laser light 20 can be freely set by the hologram element without being limited to a dispersion value of the raw glass, and the aberration of each spot can be effectively amended.

Figure 7:
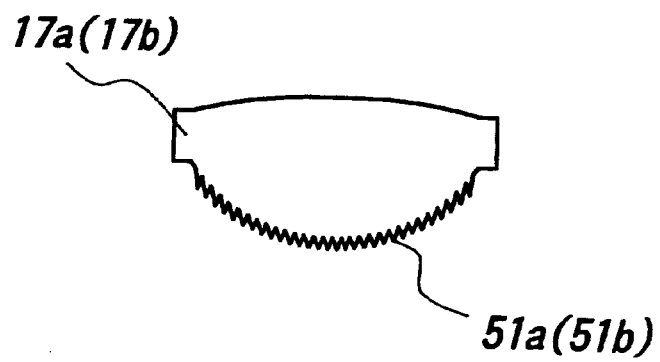
FIG. 7 is a plan view showing modified embodiment of the present invention.

Moreover, the present invention is not limited to the above described embodiments, but can be performed many changes and modifications. For example, three or more objective lenses are provided to focus the servo laser light 10 and the recording/reproducing laser light 20 with a different spot spacing, so that these objective lenses can be selected in accordance with the depth position of the record layer. Moreover, the hologram element need not always be provided in accordance with respective objective lenses, and may be provided in accordance with the arbitrary objective lens. Moreover, the hologram element can be formed integrally in one side of the objective lens 17a (17b), for example, as shown in FIG. 7. The objective lens having such a hologram element can be molded with glass or plastic.

Moreover, in the case of providing the guide track plane on the objective lens side by using the objective lens with the hologram, the spot of 780 nm can be formed on the objective lens side rather than the spot of 650 nm by using dispersion of the hologram. Therefore, for example as shown in FIG. 8(a), one objective lens 17a is formed, as in the same as the above embodiment, as for the information record medium 1 where a plurality of record layers 6 are located on the objective lens side rather than the guide track layer 2, so that the spot of 780 nm is formed on the guide track layer 2, and the spot of 650 nm is formed on the desired record layer 6. On the other hand, as shown in FIG. 8(b), the other objective lens 17b is formed as for the information record medium 1(dash) where the guide track layer 2 is located on the objective lens side rather than a plurality of record layers 6, and the hologram element 51 is integrally formed on the one surface of the objective lens 17b so as to form the spot of 780 nm on the guide track layer 2, and to form the spot of 650 nm on the desired record layer 6, so that the objective lenses 17a and 17b can be switched and be used in accordance with the information record media 1 and 1'.

Moreover, the objective lens driving means for controlling a relative position to the information record medium every each objective lens, is provided, thereby switching the objective lens every objective lens driving means by the objective lens selection means, so that the objective lens driving means and the objective lens selection means can provide separately. Moreover, the present invention can be effectively applied also to the case of using a phase change type thin film and an optical-magnet type thin film as an information record medium.

As described above, according to the present invention, in an optical pick-up device for recording and/or reproducing information optically on and/or from the information record medium having the guide track layer and a plurality of record layers in the depth direction, a plurality of objective lenses for focusing the first light beam and the second light beam with different wave length at a different spot spacing, is provided, corresponding objective lens by the objective lens selection means, is selected according to the depth position of the desired record layer to be recorded and/or reproduced, the first light beam is focused on the guide track layer through the selected objective lens, and the second light beam is focused on the desired record layer, so that deterioration in the recording/reproducing performance to each record layer in the depth direction can be effectively prevented with an easy, downsized, and cheap constitution, and thus the aberration deterioration in the first light beam can be prevented and the information can be recorded/reproduced on/from each record layer stably.

What is claimed is:

1. An optical pick-up device for optically recording and/or reproducing information on an information record medium having plural record layers and guide tracking layers in the depth direction comprising: a first light source for radiating a first light beam, a second light source for radiating a second light beam which is different from the first light beam, plural objective lenses selectively arranged in a common optical path for the first light beam and the second light beam, for focusing first light beam and second light beam with different spot spacing, objective lens selection means for selecting objective lens arranged in a common optical path of plural objective lenses according to depth position of desired record layer to be recorded and/or reproduced of the information recording medium, thereby focusing the first light beam on the guide track layer through the objective lens arranged in the common optical path, and focusing the second light beam on the desired record layer.

2. An optical pick-up device as claimed in claim 1, wherein the hologram element capable of arbitrarily setting the spot spacing of the first light beam and the second light beam due to the objective lens in the information record medium is provided, in accordance with at least one of plural objective lenses, thereby arranging the hologram element in the common optical path together with the objective lens.

3. An optical pick-up device as claimed in claim 1, wherein the hologram element is formed to the corresponding objective lens.

4. An optical pick-up device as claimed in claim 1, wherein an objective lens driving means for controlling a relative position of the objective lens to the information record medium is provided by at least displacing the objective lens arranged in the common optical path in the given direction, during at the recording and/or reproducing time of information for the information record medium, thereby constituting the objective lens selection means together with including at least a part of the objective lens driving means.

5. An optical pick-up device as claimed in claim 2, wherein an objective lens driving means for controlling a relative position of the objective lens to the information record medium is provided by at least displacing the objective lens arranged in the common optical path in the given direction, during at the and/or reproducing time of information for the information record medium, thereby constituting the objective lens selection means together with including at least a part of the objective lens driving means.

6. An optical pick-up device as claimed in claim 3, wherein an objective lens driving means for controlling a relative position of the objective lens to the information record medium is provided by at least displacing the objective lens arranged in the common optical path in the given direction, during at the and/or reproducing time of information for the information record medium, thereby constituting the objective lens selection means together with including at least a part of the objective lens driving means.

* * * * *